(12) United States Patent
Farshidi et al.

(10) Patent No.: US 12,535,850 B1
(45) Date of Patent: Jan. 27, 2026

(54) CLOCK GATE CLONING BASED ON CLOCKED CIRCUIT ELEMENT SWITCHING ACTIVITY

(71) Applicant: Cadence Design Systems, Inc., San Jose, CA (US)

(72) Inventors: Amin Farshidi, Austin, TX (US); Zhuo Li, Austin, TX (US); Michael Alexander, Graham, WA (US); Charles Jay Alpert, Cedar Park, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 571 days.

(21) Appl. No.: 18/106,307

(22) Filed: Feb. 6, 2023

(51) Int. Cl.
| | |
|---|---|
| *G06F 1/06* | (2006.01) |
| *G06F 30/20* | (2020.01) |
| *G06F 30/327* | (2020.01) |
| *G06F 30/337* | (2020.01) |
| *G06F 30/367* | (2020.01) |
| *G06F 30/373* | (2020.01) |
| *G06F 30/396* | (2020.01) |
| *G06F 30/398* | (2020.01) |
| *G06F 30/3312* | (2020.01) |

(52) U.S. Cl.
CPC .............. *G06F 1/06* (2013.01); *G06F 30/396* (2020.01); *G06F 30/20* (2020.01); *G06F 30/327* (2020.01); *G06F 30/3312* (2020.01); *G06F 30/337* (2020.01); *G06F 30/367* (2020.01); *G06F 30/373* (2020.01); *G06F 30/398* (2020.01)

(58) Field of Classification Search
CPC .......... G06F 1/06; G06F 30/396; G06F 30/20; G06F 30/327; G06F 30/3312; G06F 30/337; G06F 30/367; G06F 30/373; G06F 30/398

USPC ....... 716/120, 105, 108, 109, 113, 114, 133, 716/134; 703/16, 17, 18, 19
See application file for complete search history.

(56) References Cited

U.S. PATENT DOCUMENTS

| | | | | |
|---|---|---|---|---|
| 6,625,559 | B1 * | 9/2003 | Helder | G06F 1/10 |
| | | | | 702/117 |
| 8,826,211 | B1 * | 9/2014 | Sood | G06F 30/396 |
| | | | | 716/113 |
| 9,135,375 | B1 * | 9/2015 | Sood | G06F 30/00 |
| 9,411,912 | B1 * | 8/2016 | Sood | G06F 1/10 |
| 9,823,688 | B2 * | 11/2017 | Rajagopal | G06F 30/396 |
| 10,073,944 | B2 * | 9/2018 | Rajaram | G06F 1/10 |
| 10,296,686 | B1 * | 5/2019 | Krishnamurthy | G06F 30/327 |
| 10,650,112 | B1 * | 5/2020 | Krishnamurthy | H03K 3/037 |
| 10,963,618 | B1 * | 3/2021 | Farshidi | G06F 30/396 |
| 11,042,678 | B2 * | 6/2021 | Gupta | G06F 18/214 |
| 11,163,929 | B1 * | 11/2021 | Reece | G06F 30/337 |
| 11,797,747 | B1 * | 10/2023 | Eaton | G06F 30/327 |

(Continued)

FOREIGN PATENT DOCUMENTS

| | | | | | |
|---|---|---|---|---|---|
| JP | 2006134215 | A | * | 5/2006 | |
| JP | 2008040735 | A | * | 2/2008 | |
| KR | 20150130285 | A | * | 11/2015 | ........... G06F 30/396 |

*Primary Examiner* — Phallaka Kik

(74) *Attorney, Agent, or Firm* — Schwegman Lundberg & Woessner, P.A.

(57) ABSTRACT

Various embodiments provide for cloning a clock gate based on input/output switching activity of clocked circuit elements gated by the clock gate, where the cloning can be performed as part of a clock tree generation or optimization process performed by an electronic design automation (EDA) software.

20 Claims, 8 Drawing Sheets

(56) References Cited

U.S. PATENT DOCUMENTS

| | | | | |
|---|---|---|---|---|
| 2004/0153980 A1* | 8/2004 | Wilcox | ............ | G06F 30/30 |
| | | | | 716/108 |
| 2004/0230923 A1* | 11/2004 | Wilcox | ............ | G06F 30/327 |
| | | | | 716/135 |
| 2008/0301594 A1* | 12/2008 | Jiang | ............ | G06F 30/396 |
| | | | | 716/132 |
| 2015/0212152 A1* | 7/2015 | Agarwal | ............ | G01R 31/31707 |
| | | | | 714/731 |

* cited by examiner

CLOCK GATE CLONING BASED ON CLOCKED CIRCUIT ELEMENT SWITCHING ACTIVITY

TECHNICAL FIELD

Embodiments described herein relate to circuit design and, more particularly, to systems, methods, devices, and instructions for cloning a clock gate based on input/output switching activity of clocked circuit elements gated by the clock gate, where the cloning can be performed as part of a clock tree generation or optimization process (e.g., a clock tree synthesis (CTS) process) performed by an electronic design automation (EDA) software.

BACKGROUND

Electronic design automation (EDA) software systems commonly perform generation of a clock distribution network (also referred to as a clock network or a clock tree), which uses a branching network (e.g., of drivers, such as buffers and inverters) to distribute a clock signal from a clock signal source (a root node) to a plurality of clocked circuit elements (or clock sinks) within a circuit design. A single driver of a clock tree can distribute a clock signal to a grouping of other drivers, clocked circuit elements, or both. Connectivity between a driver and the driver's fanout to other drivers or clocked circuit elements is represented by a "clock net" and will be physically implemented by routed conductive traces, which may be referred to simply as "routes." Generally, a clock tree is generated by a clock tree synthesis (CTS) process, which structures a clock tree to provide the clock signal from the root to all the clocked circuit elements so that the clock signal ideally arrives at, or is received by, all clocked circuit elements at the same time. A circuit design can include one or more clock trees for distributing a clock signal from a clock source to all of the clocked circuit elements to be clocked by the clock signal. The clocked circuit elements usually comprise circuit devices in the circuit design that are designed to be clocked and thus need a clock signal to operate. Examples of clocked circuit elements include, without limitations, flip-flops or other sequential circuit devices that rely on a clock signal to synchronize their operations. A clocked circuit element can receive a clock signal via a clock pin included by the clocked circuit element.

BRIEF DESCRIPTION OF THE DRAWINGS

Various ones of the appended drawings merely illustrate various embodiments of the present disclosure and should not be considered as limiting its scope.

DETAILED DESCRIPTION

Figure 1:
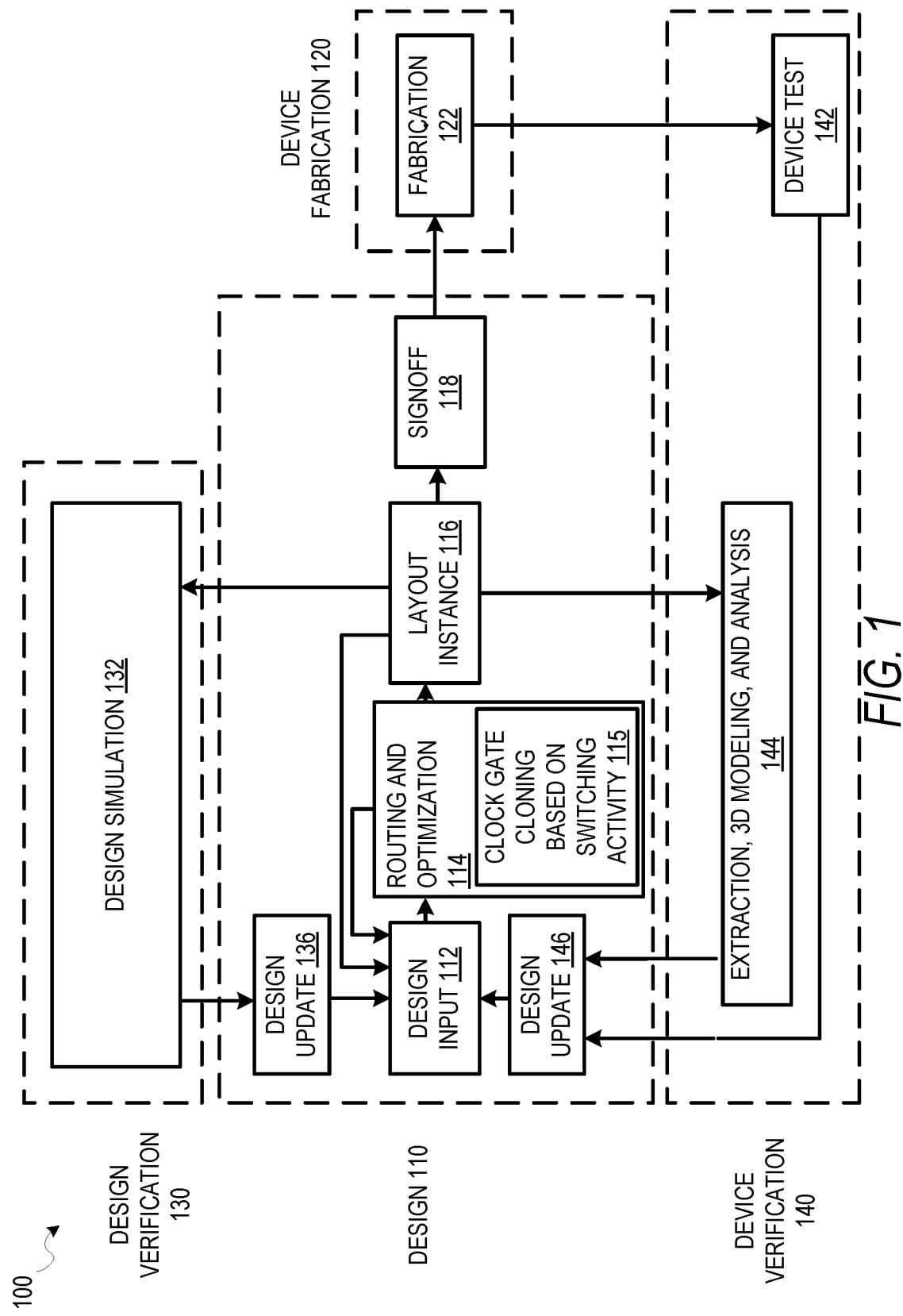
FIG. 1 is a diagram illustrating an example design process flow for cloning a clock gate based on input/output switching activity of clocked circuit elements gated by the clock gate, according to some embodiments.

Generally, a generated clock network or a clock tree comprises a branching network of fan-out buffers or fan-out inverters to distribute a clock signal from a root clock signal source to a set of clock pins of clocked circuit elements within the circuit design. Additionally, nodes of a clock network can comprise a logical or control function in the path from a clock source to a control pin, such as a clock-gate or integrated clock gate (ICG), where the function can be used to block a clock edge from reaching the clock pin and logic paths (thereby turning off the clock pin and logic paths) they contribute to. This is often referred to as clock gating the circuit element. For example, a final circuit resulting from a given circuit design can use a clock gate to turn off a cluster (or group) of clock pins (also referred to as a clock gate cluster or clock gate group (e.g., ICG group)) under certain conditions, such as when the cluster is not required for certain operations of the final circuit for the active operation of the IC. In this way, the ICG can permit the final circuit to save power that would otherwise be consumed by the cluster had it not been gated from the clock tap by the ICG. The basic clock gating topology of a clock network is defined during CTS.

Clock gate switching activity (or clock switching activity) refers to activity that causes one or more clock gates of a clock tree to turn on or off. Generally, the lower the clock gate switching activity of a clock tree, the lower the power consumption of the clock tree. This is because each clock gate is usually constructed using transistors that have transistor capacitance, and the higher the clock gate switching activity, the more often this transistor capacitance would need to be charged and discharged. Overall, clock gate switching activity of a clock tree can be determined based on input/output switching activity of clocked circuit elements (e.g., D and Q pin switching activity of flip-flops, also referred to herein as D/Q switching activity) operatively coupled to the clock tree, where the input/output switching activity of clocked circuit elements (also referred to herein as clocked circuit element switching activity) determine if and when clock gates of the clock tree are enabled.

For example, certain clock tree generation techniques use exclusive-OR (XOR) clock gating schemes to facilitate turning clock gates on and off within a clock tree while improving power consumption within the clock tree. Under an XOR clock gate scheme, D and Q pins of a flip flop is passed through an XOR gate to detect if the state of D and Q pins are different, in which case the XOR gate would cause a clock gate coupled to the flip-flop to be enabled to deliver a clock signal from the clock gate to the flip-flop. However, if the D and Q pins have the same state, the XOR gate can cause the clock gate to be disabled, as the flip-flop does not need to change state.

Additionally, a clock tree can include one or more drivers (e.g., buffers and inverters) to relay and maintain the integrity of a clock signal being distributed within the clock tree, and can help address delay issues within the clock tree (e.g., clock signal within the clock tree not meeting clock skew targets). Since the inclusion of drivers in a clock tree can increase power consumption by the clock tree, generating a clock tree often involves balancing delay (e.g., clock slew or slew) within the clock tree with power consumption by the clock tree. Such balancing can be facilitated by adding drivers to or removing drivers from a clock tree and/or by cloning one or more clock gates of clock gate clusters (also referred to as clock gate cloning). For instance, cloning of a select clock gate of a select clock gate cluster can comprise inserting two or more clones of the select clock gate in a clock tree in place of the select clock gate, and redistributing or splitting up the existing logical structure of the select clock gate cluster (which coupled the select clock gate to various clocked circuit elements) as separate clock gate clusters (e.g., sub-trees) under the cloned clock gates. As a result, clock gate cloning can clone the select clock gate and the logical structure of the select clock gate cluster without necessarily cloning the exact physical structure of the select clock gate cluster. In doing so, clock gate cloning can enable physical sizing of clock gate clusters (e.g., physical sizing of different sub-trees under clock gates) to be adjusted within the clock tree to fine tune delays within the clock tree, while maintaining the logical structure of the clock tree.

While XOR clock gating is very efficient if it is applied on a set of clocked circuit elements (e.g., flip-flops) with similar input/output switching activities (e.g., D/Q pin switching activities, also referred to herein as D/Q switching activity), XOR clock gating does not operate well when the set of clocked circuit elements includes at least one of clocked circuit element that has a different input/output switching activity. Unfortunately, conventional clock gate schemes (such as XOR clock gating) and the wide range of clock gate switching activity at clock pins of clocked circuit elements (e.g., flip-flops) of a circuit design, have rendered clock area and wire/cell capacitance as less accurate proxies of power consumption by a clock tree, and conventional CTS algorithms rely on clock area and wire/cell capacitance to optimize clock trees for power consumption.

Various embodiments provide for cloning a clock gate based on input/output switching activity of clocked circuit elements gated by the clock gate, where the cloning can be performed as part of a clock tree generation or optimization process (e.g., a clock tree synthesis (CTS) process) performed by an electronic design automation (EDA). In particular, some embodiments provide for a switching activity-aware clock gate cloning process that generates one or more clones of a select clock gate (and the sub-tree coupled thereunder) based on clock gate switching activity of individual clocked circuit elements operatively being provided a clock signal by the clock gate, where the clock gate switching activity of individual clocked circuit elements is based on the input/output switching activity of those clocked circuit elements (e.g., D/Q switching activities of flip-flops). Accordingly, a switching activity-aware clock gate cloning process of some embodiments generates one or more clones (clock gate clones) of a select clock gate based on input/output switching activity of clocked circuit elements gated by the select clock gate.

For example, a switching activity-aware clock gate cloning process described herein can clone a clock gate within a clock tree such that resulting clock clusters under those cloned clock gates effectively cluster clocked circuit elements of similar input/output switching activity (e.g., flip-flops of similar D/Q switching activity) separately. For instance, where a select clock gate having a clock gate cluster comprising one or more clocked circuit elements that have high input/output switching activity and one or more clocked circuit elements that have low input/output switching activity, the cloning of the select clock gate can result in a first cloned clock gate having a first clock gate cluster and a second cloned clock gate having a second clock gate cluster, where the first clock gate cluster comprises the one or more clocked circuit elements that have high input/output switching activity, and where the second clock gate cluster comprises the one or more clocked circuit elements that have low input/output switching activity. By cloning clock gates, such that resulting clock gate clusters that comprise clocked circuit elements of similar input/output switching activity, the switching activity-aware clock gate cloning process of various embodiments enables generations of a clock tree with XOR gating that operate efficiently, or more efficiently than possible, using conventional clock gate cloning methodologies.

Additionally, the switching activity-aware clock gate cloning process of some embodiments generates one or more clones (clock gate clones) of a select clock gate based on input/output switching activity of clocked circuit elements, and further based on whether a generated clock gate clone can drive its load (its ICG cluster/group) while meeting one or more constraints, such a clock slew constraint, a capacitance constraint, or a clock skew balancing constraint. Depending on the embodiment, the switching activity-aware clock gate cloning described herein can be used during or after a CTS process (or algorithm) to directly optimize power consumption of a clock tree generated by the CTS process.

As used herein, a clock network or a clock tree comprises a branching network (e.g., of drivers) to distribute a clock signal from a source node, which is coupled to a clock signal source within a circuit design, to a plurality of sink nodes, which is coupled to clocked circuit elements (or clock sinks) within the circuit design. A clocked circuit element usually comprises a circuit device in the circuit design that are designed to be clocked and thus needs a clock signal to operate. Examples of clocked circuit elements include, without limitations, flip-flops or other sequential circuit devices that rely on a clock signal to synchronize their operations. A clocked circuit element can receive a clock signal via a clock pin included by the clocked circuit element.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a diagram illustrating an example design process flow 100 for cloning a clock gate based on input/output switching activity of clocked circuit elements gated by the clock gate, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. The routing and optimization 114 operation may also include other operations not shown, such as those relating to floorplanning, placement, post-placement optimization, and post-routing optimization. As shown, the routing and optimization 114 operation includes a clock gate cloning based on switching activity 115 operation (hereafter, the clock gate cloning 115 operation), which may be performed in accordance with various embodiments described herein. For some embodiments, at least some portion of the clock gate cloning 115 operation can be performed prior to, during, or after a CTS process being performed on a circuit design.

While the design process flow 100 shows optimization occurring prior to a layout instance 116, timing analysis and optimization may be performed at any time to verify operation of a circuit design. For instance, in various embodiments, timing analysis in a circuit design may be performed prior to routing of connections in the circuit design; after routing, during register transfer level (RTL) operations; or as part of a signoff 118, as described below.

Design inputs are used in the design input 112 operation to generate an initial circuit layout. The design inputs may be further processed during the design input 112 operation via a process, such as logic-synthesis, to generate a circuit netlist mapped to a target standard library manufacturable by the foundry in a fabrication 122 operation. After design inputs are used in the design input 112 operation to generate an initial circuit layout, and any of the routing and optimization 114 operations are performed, a resulting layout is generated as the layout instance 116. The netlist, as placed by the layout instance 116, describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations and layout modifications generated based on actual device performance.

As described in more detail below, a design update 136 from the design simulation 132 operations; a design update 146 from the device test 142 operations or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

Figure 2:
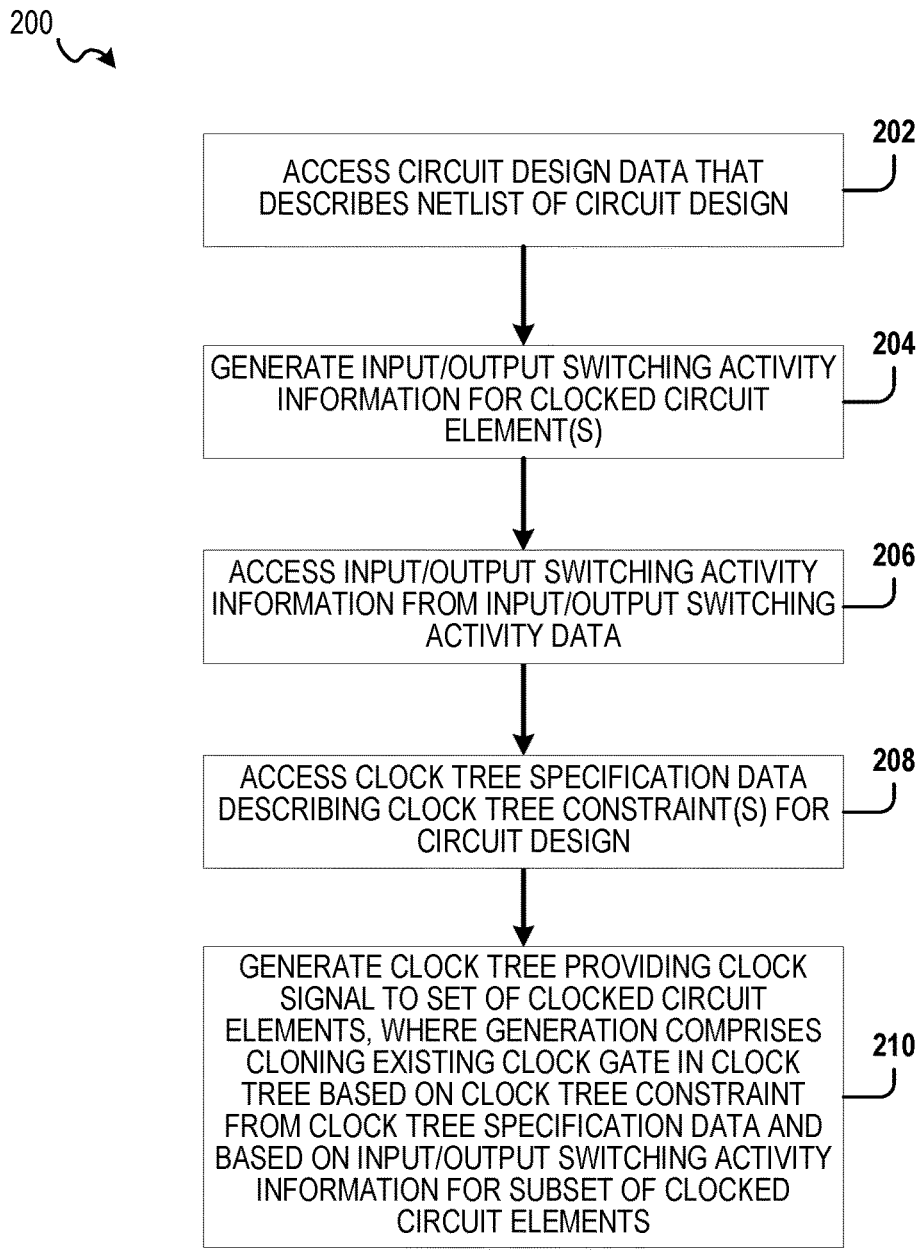
FIG. 2 is a flowchart illustrating an example method for cloning a clock gate based on input/output switching activity of clocked circuit elements gated by the clock gate, according to some embodiments.

FIG. 2 is a flowchart illustrating an example method for cloning a clock gate based on input/output switching activity of clocked circuit elements gated by the clock gate, according to some embodiments. It will be understood that example methods described herein may be performed by a device, such as a computing device executing instructions of an EDA software system, in accordance with some embodiments. Additionally, example methods described herein may be implemented in the form of executable instructions stored on a computer-readable medium or in the form of electronic circuitry. For instance, the operations of a method 200 of FIG. 2 may be represented by executable instructions that, when executed by a processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

For some embodiments, one or more operations of the method 200 are performed prior to, during, or after a CTS process being performed on a circuit design (e.g., by an EDA software system). An operation of the method 200 (or another method described herein) may be performed by a hardware processor (e.g., central processing unit or graphics processing unit) of a computing device (e.g., desktop, server, etc.).

As illustrated, at operation 202, circuit design data is accessed, where the design data describes a netlist of a circuit design, where the netlist comprises one or more clocked circuit elements of the circuit design. A clocked circuit element can comprise as one or more flip flops. Depending on the embodiment, the netlist can comprise non-clocked circuit elements of the circuit design. The netlist can include placement (e.g., placement information) for circuit elements (e.g., clocked and non-clocked circuit elements) of the circuit design. Additionally, the netlist can comprise partially constructed clock sub-trees.

Operation 204 of the method 200 generates input/output switching activity information for at least a subset of the one or more clocked circuit elements (e.g., D/Q pin switching activity information for a subset of flip-flops) of the circuit design. For example, the input/output switching activity of a specific clocked circuit element can be represented by a value, such as a decimal value (e.g., between 0.0 and 1.0). For some embodiments, operation 204 comprises simulating operation of at least a portion of the circuit design, which can include simulating operation of at least the set of clocked circuit elements. For some embodiments, operation 204 is performed prior to, or as part of, a placement operation that is performed on the circuit design. As generated, the input/output switching activity information can be saved as input/output switching activity data accessible by subsequent operations, such as a subsequent operation of the method 200, a pre-CTS operation, or an operation of a CTS process. For some embodiments, the input/output switching activity information is determined based on information from a technology library selected for the circuit design. A technology library can describe or provide information for one or more physical circuits of clock gates, enable gates, clocked circuit elements, as well as other circuit elements for implementing a clock tree (or clock network) for the circuit design. A technology library can also be described or provide information about one or more physical gates of the circuit design, which can be used to model operation (e.g., simulated operation) of the circuit design that are implemented in the circuit design, including the clock tree. Accordingly, a technology library selected for the circuit design can determine input/output switching activity information generated (e.g., by operation 204 using a simulation process) for one or more clocked circuit elements of the circuit design. At operation 206, input/output switching activity information, for one or more clocked circuit elements of the circuit design, is accessed from input/output switching activity data (e.g., generated by operation 206).

Operation 208 of the method 200 accesses clock tree specification data, that describes one or more clock tree constraints for (e.g., a clock tree of) the circuit design. Examples of clock tree constraints can include, without limitation, a load constraint (e.g., load limit of a clock gate), a clock period (T), a clock frequency, enable signal timing constraint, a clock signal timing constraint (e.g., a clock slew constraint or a clock skew balancing constraint), and a capacitance constraint.

Thereafter, operation 210 generates a clock tree (e.g., generate a netlist of the clock tree) that provides a clock signal (e.g., from as a clock source at a root node) to a set of clocked circuit elements of the one or more clocked circuit elements, where the generating of the clock tree comprises cloning (e.g., switching-aware cloning) an existing clock gate in the clock tree based on at least one clock tree constraint from the clock tree specification data (accessed by operation 208) and based on input/output switching activity information (accessed by operation 206) for a subset of clocked circuit elements, and where the existing clock gate forms an existing clock gate cluster that comprises clock pins of the subset of clocked circuit elements (e.g., output of the existing clock gate is operatively coupled to and provides a clock signal to the clock pins). The subset of clocked circuit elements can comprise at least one flip-flop, and the input/output switching activity information can comprise D/Q switching activity for the at least one flip-flop. For some embodiments, operation 210 is performed as part of a CTS process, which can generate a netlist of the clock tree (e.g., a netlist of the clock tree that includes a physical clock gate typology with respect to placements of the one or more clocked circuit elements of the circuit design).

According to various embodiments, by considering input/output switching activity information of one or more clocked circuit elements (e.g., D/Q pin switching activity information for a subset of flip-flops) of a circuit design, operation 210 can insert one or more clones of an existing clock gate in the clock tree such that the clones and the existing clock gate form two or more (e.g., new) clock gate clusters from the existing clock gate cluster, and such that clocked circuit elements, having similar input/output switching activity (e.g., high or low input/output switching activity), to be clustered in a common clock gate cluster. For instance, operation 210 can clone an existing clock gate in the clock tree such that clocked circuit elements having high input/output switching activity can be clustered within a (first) clock gate cluster of the clock tree, and that clocked circuit elements having low input/output switching activity can result can be clustered within another (second) clock gate cluster of the clock tree. For example, where the input/output switching activity of a given clocked circuit element is represented by a value (e.g., a decimal value), the input/output switching activity value (e.g., D/Q switching activity value) of each of clocked circuit elements, the first clock gate cluster can have a first similar (e.g., equal) value or a value that falls within a first common range of values, and the input/output switching activity value (e.g., D/Q switching activity value) of each of clocked circuit elements the second clock gate cluster can have a second similar (e.g., equal) value or a value that falls within a second common range of values.

According to some embodiments, a generated clone of the existing clock gate is enabled and disabled by exclusive-OR (XOR) gating (e.g., using an XOR gating mechanism or methodology). As described herein, using such a switching-aware clock gate cloning operation can improve the use (e.g., efficiency) of XOR gating in the clock tree, which is used to enable or disable one or more clock gates in the clock tree. An example of XOR gating a clock gate in a clock tree is described and illustrated with respect to FIGS. 3 and 4.

For an existing clock gate in the clock tree, operation 210 can clone existing clock gates by determining (e.g., identifying), from the existing clock gate cluster (e.g., an existing sub-tree of the clock tree) of the existing clock gate, two or more clock gate clusters (e.g., sub-trees), based on the at least one clock tree constraint and based on the input/output switching activity information for the subset of clocked circuit elements that are part of the existing clock gate cluster. As noted herein, each of the two or more clock gate clusters determined by operation 210 can comprise clock pins of clocked circuit elements having similar input/output switching activity. The determination of the two or more clock gate clusters by operation 210 can comprise performing a bottom-up clustering process on the clock tree to determine the two or more clock gate clusters from the existing clock gate cluster based on the at least one clock tree constraint and based on the input/output switching activity information. Based on the determined (e.g., identified) two or more clock gate clusters, operation 210 can replace the existing clock gate cluster with the two or more (e.g., new) clock gate clusters. Such replacement can be performed by inserting in the clock tree (e.g., next or adjacent to the existing clock gate such the clones and the existing clock gate share the same parent node) one or more clones of the existing clock gate, where the one or more clones and the existing clock gate operatively couple the two or more clock gate clusters (e.g., sub-trees) to the clock tree.

Figure 3:
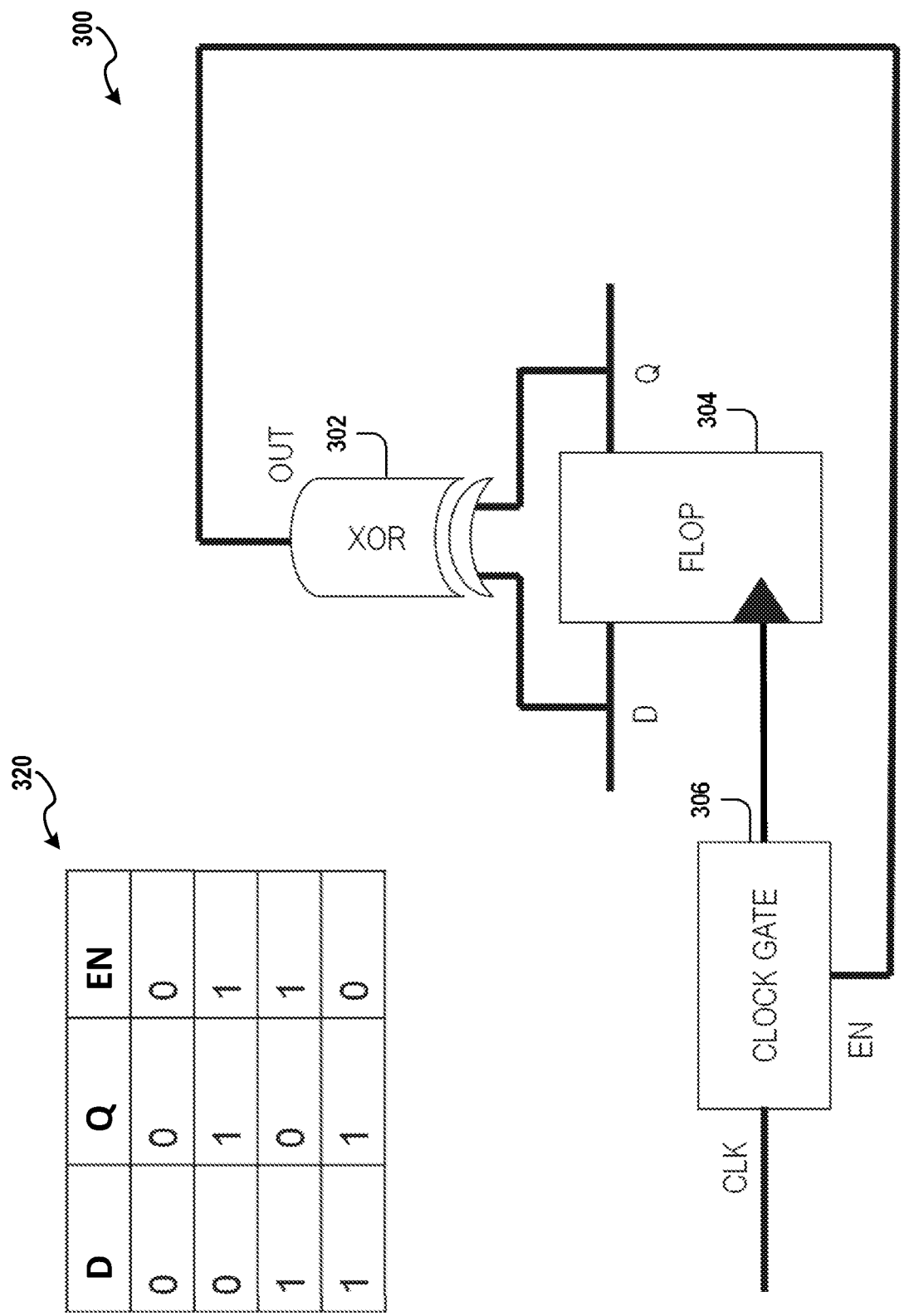
FIG. 3 is a circuit schematic illustrating an example implementation of exclusive-OR (XOR) gating with respect to an example clock gate, according to some embodiments.

FIG. 3 is a circuit schematic 300 illustrating an example implementation of exclusive-OR (XOR) gating with respect to an example clock gate 306, according to some embodiments. In particular, the clock gate 306 comprises a pin for receiving a clock signal (CLK) and a pin for receiving an enable signal (EN). A flip-flop 304 comprises a clock pin to receive a clock signal, a D pin to receive an input data signal, and a Q pin to output an output data signal. For some embodiments, the clock gate 306 outputs (via an output pin of the clock gate 306) the clock signal (CLK) to the flip-flop 304 when the clock gate 306 is enabled, and disables (e.g., prevents) output of the clock signal (CLK) to the flip-flop 304 when the clock gate 306 is disabled. The enable signal (EN) can control whether the clock gate 306 is enabled or disabled (e.g., the clock gate 306 is enabled when the enable signal (EN) is asserted.) In this way, the clock gate 306 gates the clock signal received by the flip-flop 304. As shown, an XOR gate 302 comprises two inputs (a first input and a second input), and generates the enable signal (EN) based on the two inputs. The output of the XOR gate 302 is operatively coupled to the pin of the clock gate 306 configured to receive the enable signal (EN). The first input of the XOR gate 302 receives an input signal (e.g., input data signal) that is received by a D pin of the flip-flop 304, and the second input of the XOR gate 302 receives an output signal (e.g., output data signal) that is generated by the flip-flop 304 and outputted by a Q pin of the flip-flop 304. In FIG. 3, table 320 illustrates a value of an input signal received by the D pin and the first input of the XOR gate 302, a value of an output signal outputted by the Q pin and the second input of the XOR gate 302, and a value of an enable signal (EN) generated by the XOR gate 302 based on the value of the input signal and the value of the output signal.

Figure 4:
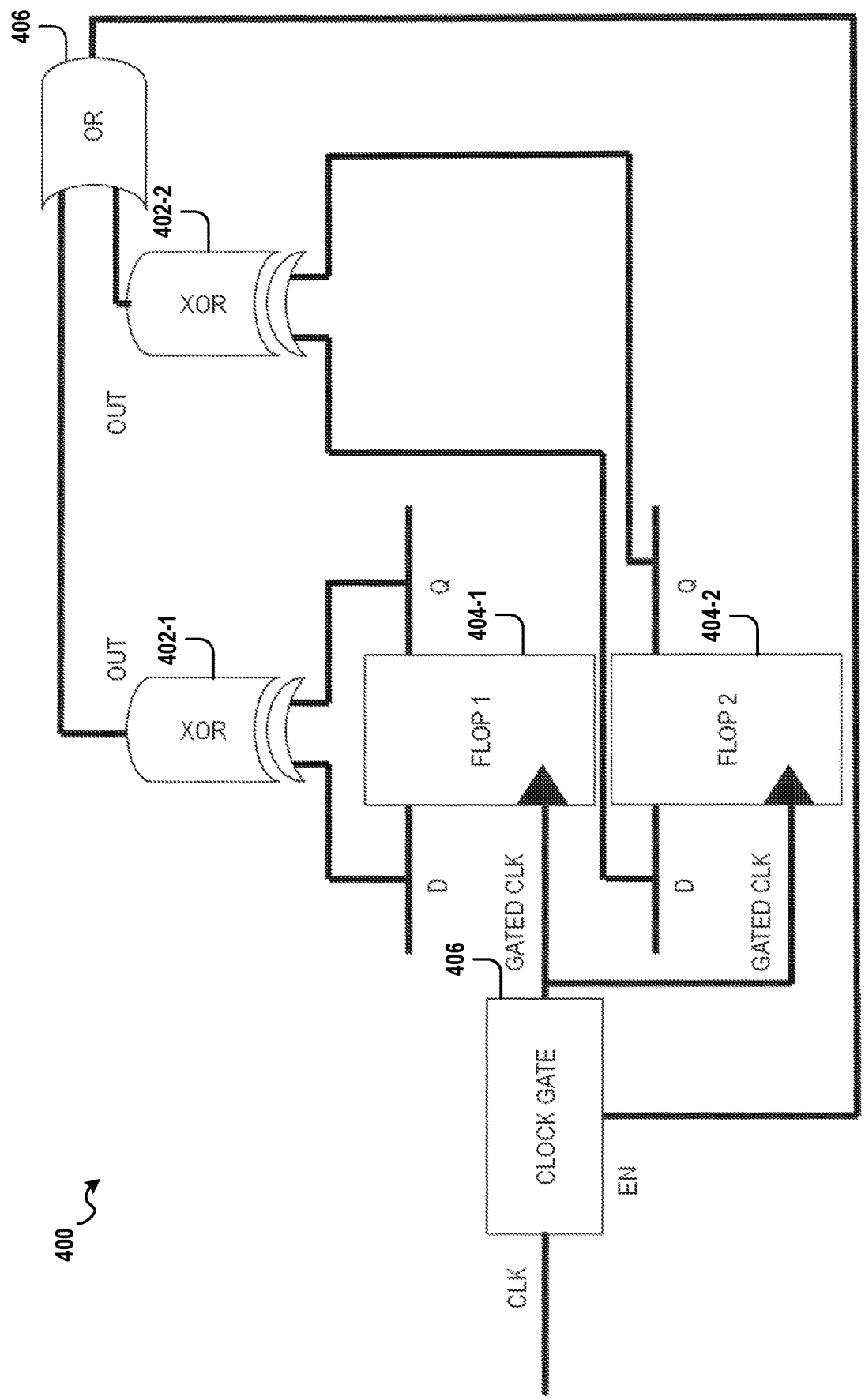
FIG. 4 is a circuit schematic illustrating an example implementation of XOR gating with respect to an example clock gate that can be cloned based on input/output switching activity of clocked circuit elements, according to some embodiments.

FIG. 4 is a circuit schematic 400 illustrating an example implementation of XOR gating with respect to an example clock gate 406 that can be cloned based on input/output switching activity of clocked circuit elements, according to some embodiments. In particular, the clock gate 406 comprises a pin for receiving a clock signal (CLK) and a pin for receiving an enable signal (EN). Each flip-flop 404-1, 404-2 comprises a clock pin to receive a clock signal, a D pin to receive an input data signal, and a Q pin to output an output data signal. Similar to the clock gate 306 of FIG. 3, the clock gate 406 outputs (via an output pin of the clock gate 406) the clock signal (CLK) to the flip-flops 404-1, 404-2 when the clock gate 406 is enabled, and disables (e.g., prevents) output of the clock signal (CLK) to the flip-flops 404-1, 404-2 when the clock gate 406 is disabled. The enable signal (EN) can control whether the clock gate 406 is enabled or disabled (e.g., the clock gate 406 is enabled when the enable signal (EN) is asserted. In this way, the clock gate 406 gates the clock signal received by each of the flip-flops 404-1, 404-2. As shown, each XOR gates 402-1, 402-2 comprises two inputs (a first input and a second input) and generates an output signal (OUT) based on their respective two inputs. Inputs of an OR gate 406 are operatively coupled to the outputs of the XOR gates 402-1, 402-2, the OR gate 406 receives the output signal (OUT) generated by each of the XOR gates 402-1, 402-2, and the OR gate 406 generates the enable signal (EN) based on the output signals received from the XOR gates 402-1, 402-2. The output of the OR gate 406 is operatively coupled to the pin of the clock gate 406 configured to receive the enable signal (EN). The first input of the XOR gate 402-1 receives an input signal (e.g., input data signal) that is received by a D pin of the flip-flop 404-1, and the second input of the XOR gate 402-1 receives an output signal (e.g., output data signal) that is generated by the flip-flop 404-1 and outputted by a Q pin of the flip-flop 404-1. Likewise, the first input of the XOR gate 402-2 receives an input signal (e.g., input data signal) that is received by a D pin of the flip-flop 404-2, and the second input of the XOR gate 402-2 receives an output signal (e.g., output data signal) that is generated by the flip-flop 404-2 and outputted by a Q pin of the flip-flop 404-2. The clock pins of the flip-flops 404-1, 404-2 form a clock gate cluster of the clock gate 406. According to various embodiments, a cloning operation performed on the clock gate 406 based on the D/Q switching activity information of each of the flip-flops 404-1, 404-2.

Figure 5:
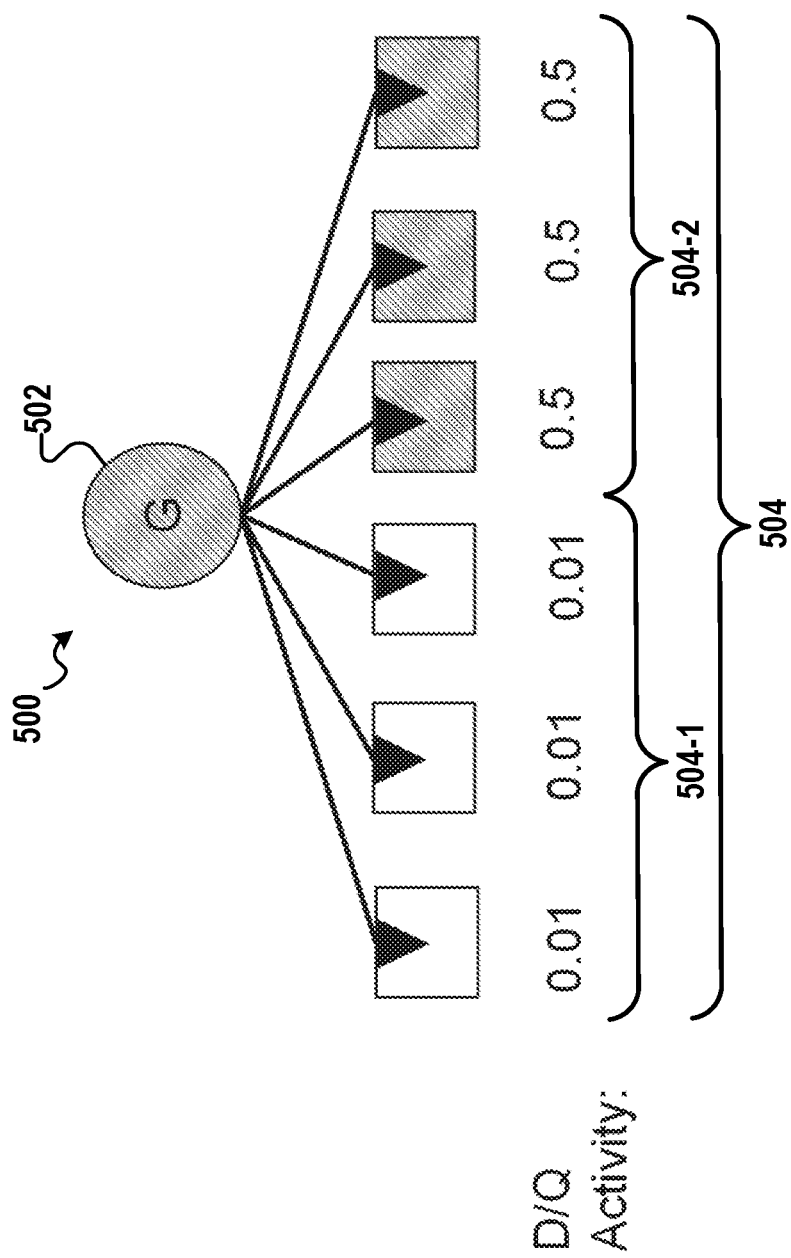
FIG. 5 is a diagram of an example clock gate and example clocked circuit elements that receive a gated clock signal from the clock gate, according to some embodiments.

FIG. 5 is a diagram of an example clock gate 502 and example clocked circuit elements 504 that receive a gated clock signal from the clock gate 502, according to some embodiments. According to various embodiments, clock pins of the clocked circuit elements 504 and the clock gate 502 form a clock gate cluster 500. As shown, clocked circuit elements 504-1 each have a D/Q switching activity value of 0.01, and three of clocked circuit elements 504-2 each have a D/Q switching activity value of 0.5, where the higher value represents higher DQ switching activity. Due to the D/W switching activity of the clocked circuit elements 504-2, the clock gate 502 is subjected to higher clock gate switching activity (between the enable and disabled state) than if the clock gate 502 were only gating a clock signal for the clocked circuit elements 504-1. According to various embodiments, based on the D/Q switching activity of the clocked circuit elements 504, a cloning operation performed on the clock gate 502 based on the D/Q switching activity of the clocked circuit elements 504. An example of cloning the clock gate 502 according to an embodiment is described and illustrated with respect to FIG. 6.

Figure 6:
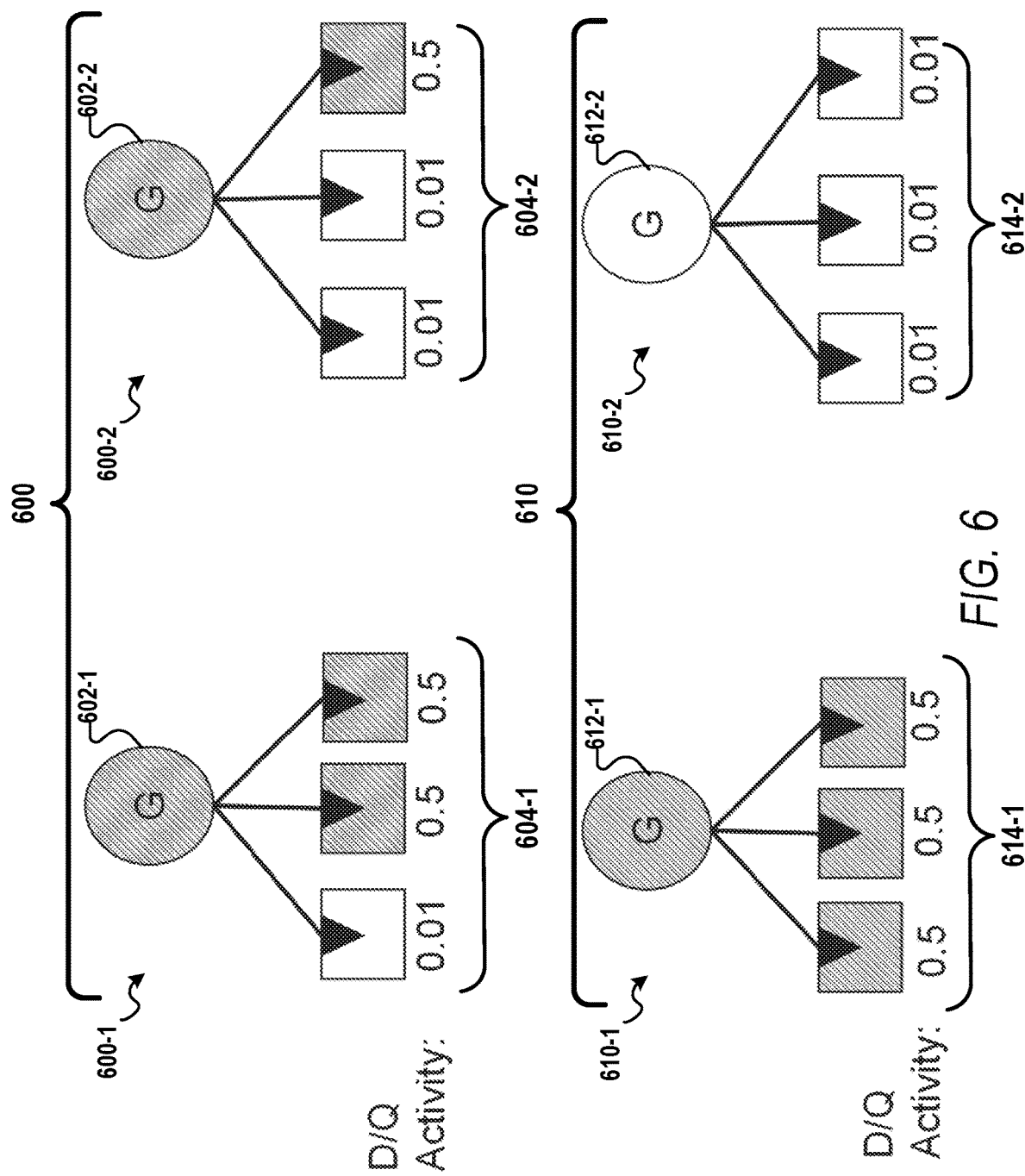
FIG. 6 is a diagram illustrating an example of cloning a clock gate based on input/output switching activity of clocked circuit elements, according to some embodiments.

FIG. 6 is a diagram illustrating an example of cloning the clock gate 502 of FIG. 5 based on input/output switching activity of clocked circuit elements, according to some embodiments. In particular, example clock gate clusters 600 illustrate clock gate clusters generated by cloning the clock gate 502 using a conventional cloning methodology, where clock gate cluster 600-1 includes clock pins of clocked circuit elements 604-1 operatively coupled to an output of a clock gate 602-1, and clock gate cluster 600-2 includes clock pins of clocked circuit elements 604-2 operatively coupled to an output of a clock gate 602-2. One of the clock gates 602-1, 602-2 can represent a clone of the clock gate 502, and the clocked circuit elements 604-1 and the clocked circuit elements 604-2 are clustered from the clocked circuit elements 504 of FIG. 5 based on conventional considerations. As shown, each of the clocked circuit elements 604-1 and the clocked circuit elements 604-2 includes clocked circuit elements having different D/Q switching activity (e.g., 0.1 and 0.5) and, as such, each of the clock gates 602-1, 602-2 are subjected to high clock gate switching activity as a result of the clocked circuit elements with higher D/Q switching activity (e.g., 0.5). As a result, neither of the clock gates 602-1, 602-2 can be efficiently enabled/disabled relative to each other, as both will have to be enabled most of the time, as they drive at least one clocked circuit element having a D/Q switching activity of 0.5.

In comparison, example clock gate clusters 610 illustrate clock gate clusters generated by cloning the clock gate 502 using a cloning based on input/output switching activity of clocked circuit elements as described herein. Clock gate cluster 610-1 includes clock pins of clocked circuit elements 614-1 operatively coupled to an output of a clock gate 612-1, and clock gate cluster 610-2 includes clock pins of clocked circuit elements 614-2 operatively coupled to an output of a clock gate 612-2. One of the clock gates 612-1, 612-2 can represent a clone of the clock gate 502, and the clocked circuit elements 614-1 and the clocked circuit elements 614-2 are clustered from the clocked circuit elements 504 based on conventional considerations. As shown, each of the clocked circuit elements 614-1 and the clocked circuit elements 614-2 includes clocked circuit elements having similar D/Q switching activity, with the clocked circuit elements 614-1 have D/Q switching activity of 0.1 and the clocked circuit elements 614-2 have D/Q switching activity of 0.5. In comparison to the clock gate clusters 600, in the clock gate clusters 610 generated, only the clock gate 612-1 is subjected to higher clock gate switching activity as a result of its clocked circuit elements 614-1 having a D/W switching activity of 0.5, while the clock gate 612-2 has lower clock gate switching activity as a result of its clocked circuit elements 614-2 having a D/W switching activity of 0.1. As a result, at least one clock gate (the clock gate 612-2) can be efficiently enabled/disabled relative to each other, as the clock gate 612-2 can be disabled most of the time (due to its clocked circuit elements 614-2 having a D/Q switching activity of 0.1) relative to the clock gate 612-1 (which has clocked circuit elements having a D/Q switching activity of 0.5).

Figure 7:
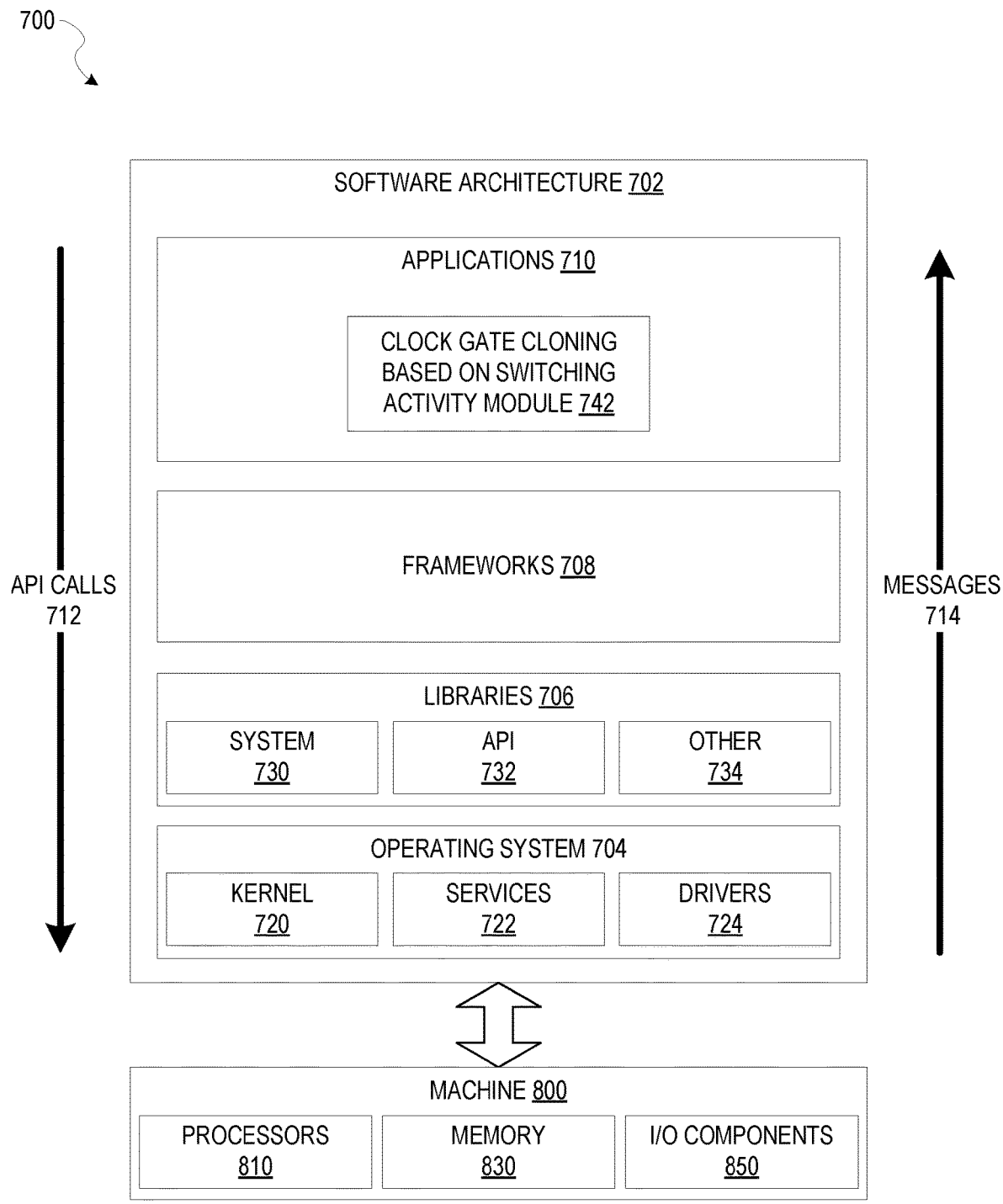
FIG. 7 is a block diagram illustrating an example of a software architecture that may be operating on an EDA computing device and may be used with methods for cloning a clock gate based on input/output switching activity of clocked circuit elements gated by the clock gate, according to some embodiments.

FIG. 7 is a block diagram 700 illustrating an example of a software architecture 702 that may be operating on an EDA computer and may be used with methods for cloning a clock gate based on input/output switching activity of clocked circuit elements gated by the clock gate, according to some embodiments. The software architecture 702 can be used as an EDA computing device to implement any of the methods described above. Aspects of the software architecture 702 may, in various embodiments, be used to store circuit designs, and to facilitate generation of a circuit design in an EDA environment by cloning a clock gate based on input/output switching activity of clocked circuit elements gated by the clock gate, from which physical devices may be generated.

FIG. 7 is merely a non-limiting example of a software architecture 702, and it will be appreciated that many other architectures can be implemented to facilitate the functionality described herein. In various embodiments, the software architecture 702 is implemented by hardware such as a machine 800 of FIG. 8 that includes processors 810 (e.g., hardware processors), memory 830, and input/output (I/O) components 850. In this example, the software architecture 702 can be conceptualized as a stack of layers where each layer may provide a particular functionality. For example, the software architecture 702 includes layers such as an operating system 704, libraries 706, software frameworks 708, and applications 710. Operationally, the applications 710 invoke application programming interface (API) calls 712 through the software stack and receive messages 714 in response to the API calls 712, consistent with some embodiments. In various embodiments, any client device, any server computer of a server system, or any other device described herein may operate using elements of the software architecture 702. An EDA computing device described herein may additionally be implemented using aspects of the software architecture 702, with the software architecture 702 adapted for cloning a clock gate based on input/output switching activity of clocked circuit elements gated by the clock gate in any manner described herein.

In some embodiments, an EDA application of the applications 710 clones a clock gate based on input/output switching activity of clocked circuit elements gated by the clock gate according to embodiments described herein using various modules within the software architecture 702. For example, in some embodiments, an EDA computing device similar to the machine 800 includes the memory 830 and the one or more processors 810. The processors 810 also implement clock gate cloning based on switching activity module 742 (hereafter, the clock gate cloning module 742) for cloning a clock gate based on input/output switching activity of clocked circuit elements gated by the clock gate, in accordance with various embodiments described herein.

In various other embodiments, rather than being implemented as modules of the one or more applications 710, the clock gate cloning module 742 may be implemented using elements of the libraries 706, the operating system 704, or the software frameworks 708.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionalities. The services 722 can provide other common services for the other software layers. The drivers 724 are responsible for controlling or interfacing with the underlying hardware, according to some embodiments. For instance, the drivers 724 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 such as libraries of blocks for use in an EDA environment or other libraries that can provide functions such as memory allocation functions, string manipulation functions, mathematic functions, and the like. In addition, the libraries 706 can include API libraries 732 such as media libraries (e.g., libraries to support presentation and manipulation of various media formats such as Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 706 may also include other libraries 734.

The software frameworks 708 provide a high-level common infrastructure that can be utilized by the applications 710, according to some embodiments. For example, the software frameworks 708 provide various graphic user interface (GUI) functions, high-level resource management, high-level location services, and so forth. The software frameworks 708 can provide a broad spectrum of other APIs that can be utilized by the applications 710, some of which may be specific to a particular operating system 704 or platform. In various embodiments, the systems, methods, devices, and instructions described herein may use various files, macros, libraries, and other elements of an EDA design environment to implement cloning a clock gate based on input/output switching activity of clocked circuit elements gated by the clock gate as described herein. This includes analysis of input design files for an integrated circuit design, along with any element of hierarchical analysis that may be used as part of or along with the embodiments described herein. While netlist files, library files, SDC files, and view definition files are examples that may operate within the software architecture 702, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose hardware processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 800 including processors 810), with these operations being accessible via a network (e.g., the Internet) and via one or more appropriate interfaces (e.g., an API). In certain embodiments, for example, a client device may relay or operate in communication with cloud computing systems and may access circuit design information in a cloud environment.

The performance of certain of the operations may be distributed among the processors, not only residing within a single machine 800, but deployed across a number of machines 800. In some embodiments, the processors 810 or processor-implemented modules are located in a single geographic location (e.g., within a home environment, an office environment, or a server farm). In some other embodiments, the processors or processor-implemented modules are distributed across a number of geographic locations.

Figure 8:
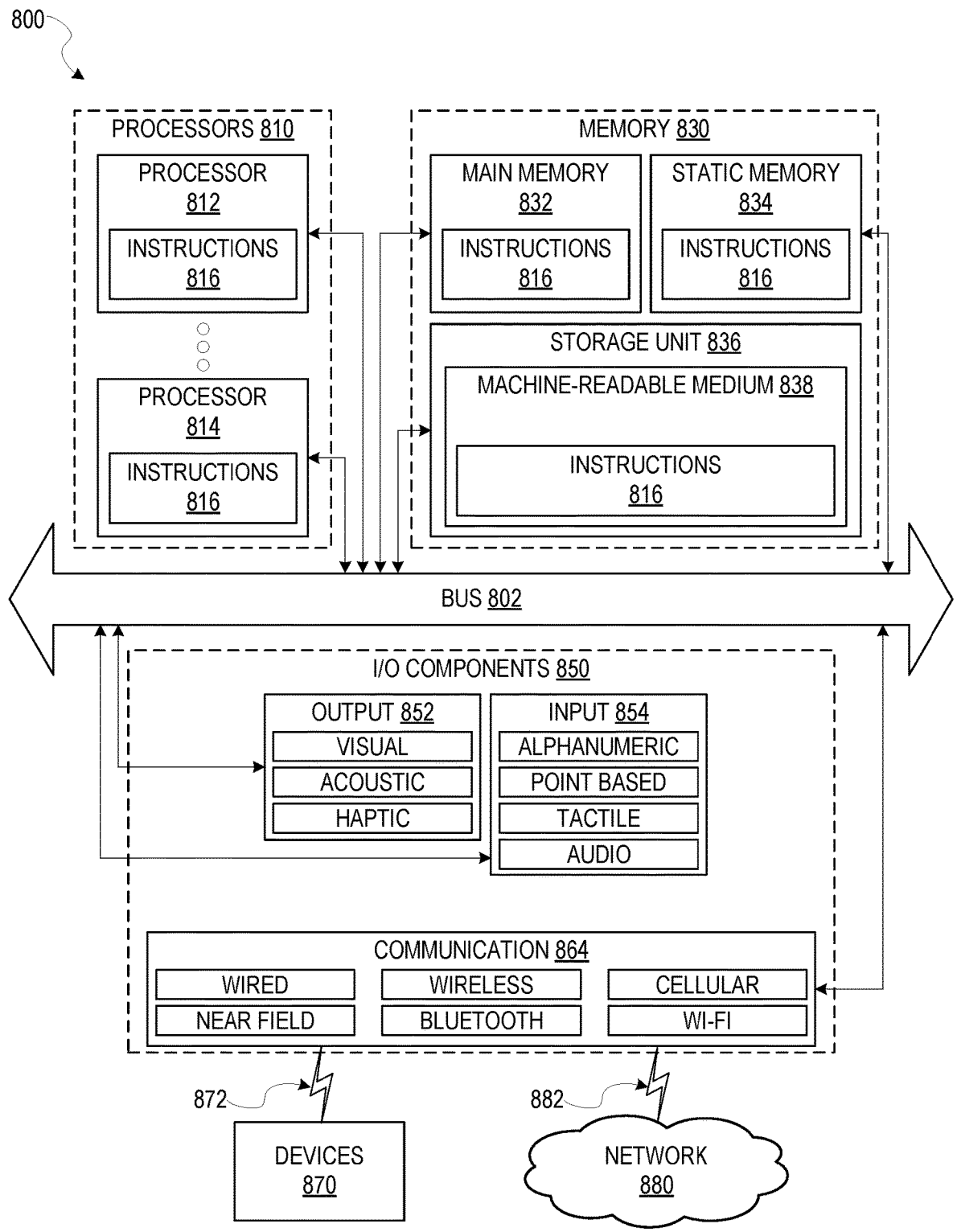
FIG. 8 is a diagram representing a machine in the form of a computer system within which a set of instructions are executed, causing the machine to perform any one or more of the methods discussed herein, according to some embodiments.

FIG. 8 is a diagrammatic representation of the machine 800 in the form of a computer system within which a set of instructions may be executed for causing the machine 800 to perform any one or more of the methodologies discussed herein, according to some embodiments. FIG. 8 shows components of the machine 800, which is, according to some embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein can be executed. In alternative embodiments, the machine 800 operates as a standalone device or can be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

In various embodiments, the machine 800 comprises processors 810, memory 830, and I/O components 850, which can be configured to communicate with each other via a bus 802. In some embodiments, the processors 810 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another, or any suitable combination thereof) include, for example, a processor 812 and a processor 814 that may execute the instructions 816. The term "processor" is intended to include multi-core processors 810 that may comprise two or more independent processors 812, 814 (also referred to as "cores") that can execute the instructions 816 contemporaneously. Although FIG. 8 shows multiple processors 810, the machine 800 may include a single processor 812 with a single core, a single processor 812 with multiple cores (e.g., a multi-core processor 812), multiple processors 810 with a single core, multiple processors 810 with multiple cores, or any combination thereof.

The memory 830 comprises a main memory 832, a static memory 834, and a storage unit 836 accessible to the processors 810 via the bus 802, according to some embodiments. The storage unit 836 can include a machine-readable medium 838 on which are stored the instructions 816 embodying any one or more of the methodologies or functions described herein. The instructions 816 can also reside, completely or at least partially, within the main memory 832, within the static memory 834, within at least one of the processors 810 (e.g., within the processor's cache memory), or any suitable combination thereof, during execution thereof by the machine 800. Accordingly, in various embodiments, the main memory 832, the static memory 834, and the processors 810 are considered machine-readable media 838.

As used herein, the term "memory" refers to a machine-readable medium 838 able to store data temporarily or permanently and may be taken to include, but not be limited to, random-access memory (RAM), read-only memory (ROM), buffer memory, flash memory, and cache memory. While the machine-readable medium 838 is shown, in some embodiments, to be a single medium, the term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., the instructions 816) for execution by a machine (e.g., the machine 800), such that the instructions, when executed by one or more processors of the machine (e.g., the processors 810), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 include a wide variety of components to receive input, provide output, produce output, transmit information, exchange information, capture measurements, and so on. In general, it will be appreciated that the I/O components 850 can include many other components that are not shown in FIG. 8. The I/O components 850 are grouped according to functionality merely for simplifying the following discussion, and the grouping is in no way limiting. In various embodiments, the I/O components 850 include output components 852 and input components 854. The output components 852 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. As described herein, "constraints," "requirements," "design elements," and other aspects of a circuit design refer to selectable values that are set as part of the design of a circuit. Such design constraints, requirements, or elements may be adjusted by a system operator or circuit designer to suit the particular goals of a project or circuit that results from the operations described herein.

Communication can be implemented using a wide variety of technologies. The I/O components 850 may include communication components 864 operable to couple the machine 800 to a network 880 or devices 870 via a coupling 882 and a coupling 872, respectively. For example, the communication components 864 include a network interface component or another suitable device to interface with the network 880. In further examples, the communication components 864 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 870 may be another machine or any of a wide variety of peripheral devices (e.g., a peripheral device coupled via a USB).

In various embodiments, one or more portions of the network 880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling.

Furthermore, the machine-readable medium 838 is non-transitory (in other words, not having any transitory signals) in that it does not embody a propagating signal. However, labeling the machine-readable medium 838 "non-transitory" should not be construed to mean that the machine-readable medium 838 is incapable of movement; the machine-readable medium 838 should be considered as being transportable from one physical location to another. Additionally, since the machine-readable medium 838 is tangible, the machine-readable medium 838 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to some embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A system comprising:
   a memory storing instructions; and
   a hardware processor communicatively coupled to the memory and configured by the instructions to perform operations comprising:
   accessing circuit design data that describes a netlist of a circuit design, the netlist comprising one or more clocked circuit elements of the circuit design;
   accessing clock tree specification data that describes one or more clock tree constraints for the circuit design; and
   generating a clock tree that provides a clock signal to a set of clocked circuit elements of the one or more clocked circuit elements, the generating of the clock tree comprises cloning an existing clock gate in the clock tree based on at least one clock tree constraint from the clock tree specification data and based on input/output switching activity information for a subset of the set of clocked circuit elements, the existing clock gate forming an existing clock gate cluster that comprises clock pins of the subset of clocked circuit elements.

2. The system of claim 1, wherein the operations further comprise:
   prior to the generating of the clock tree, accessing the input/output switching activity information from input/output switching activity data.

3. The system of claim 1, wherein the operations further comprise:
   prior to the generating of the clock tree, generating the input/output switching activity information by simulating operation of the set of clocked circuit elements.

4. The system of claim 1, wherein the at least one clock tree constraint comprises a clock slew constraint.

5. The system of claim 1, wherein the at least one clock tree constraint comprises a capacitance constraint.

6. The system of claim 1, wherein the at least one clock tree constraint comprises a clock slew balancing constraint.

7. The system of claim 1, wherein the cloning of the existing clock gate in the clock tree clusters based on the at least one clock tree constraint and based on the input/output switching activity information comprises:
   determining, from the existing clock gate cluster of the existing clock gate, two or more clock gate clusters based on the at least one clock tree constraint and based on the input/output switching activity information; and
   replacing the existing clock gate cluster with the two or more clock gate clusters by inserting in the clock tree, next to the existing clock gate, one or more clones of the existing clock gate, the one or more clones and the existing clock gate operatively coupling the two or more clock gate clusters to the clock tree.

8. The system of claim 7, wherein the determining of the two or more clock gate clusters based on the at least one clock tree constraint and based on the input/output switching activity information comprises:
   performing a bottom-up clustering process on the clock tree to determine the two or more clock gate clusters from the existing clock gate cluster based on the at least one clock tree constraint and based on the input/output switching activity information.

9. The system of claim 7, wherein each of the two or more clock gate clusters comprises clock pins of clocked circuit elements having similar input/output switching activity.

10. The system of claim 1, wherein a generated clone of the existing clock gate is enabled and disabled by exclusive-OR gating.

11. The system of claim 1, wherein the subset of the set of clocked circuit elements comprises at least one flip-flop.

12. The system of claim 11, wherein the input/output switching activity information comprises D/Q switching activity for the at least one flip-flop.

13. A non-transitory computer-readable medium comprising instructions that, when executed by a hardware processor of a device, cause the device to perform operations comprising:

accessing circuit design data that describes a netlist of a circuit design, the netlist comprising one or more clocked circuit elements of the circuit design;

accessing clock tree specification data that describes one or more clock tree constraints for the circuit design; and generating a clock tree that provides a clock signal to a set of clocked circuit elements of the one or more clocked circuit elements, the generating of the clock tree comprises cloning an existing clock gate in the clock tree based on at least one clock tree constraint from the clock tree specification data and based on input/output switching activity information for a subset of the set of clocked circuit elements, the existing clock gate forming an existing clock gate cluster that comprises clock pins of the subset of clocked circuit elements.

14. The non-transitory computer-readable medium of claim 13, wherein the operations further comprise:

prior to the generating of the clock tree, accessing the input/output switching activity information from input/output switching activity data.

15. The non-transitory computer-readable medium of claim 13, wherein the operations further comprise:

prior to the generating of the clock tree, generating the input/output switching activity information by simulating operation of the set of clocked circuit elements.

16. The non-transitory computer-readable medium of claim 13, wherein the cloning of the existing clock gate in the clock tree clusters based on the at least one clock tree constraint and based on the input/output switching activity information comprises:

determining, from the existing clock gate cluster of the existing clock gate, two or more clock gate clusters based on the at least one clock tree constraint and based on the input/output switching activity information; and replacing the existing clock gate cluster with the two or more clock gate clusters by inserting in the clock tree, next to the existing clock gate, one or more clones of the existing clock gate, the one or more clones and the existing clock gate operatively coupling the two or more clock gate clusters to the clock tree.

17. The non-transitory computer-readable medium of claim 13, wherein a generated clone of the existing clock gate is enabled and disabled by exclusive-OR gating.

18. The non-transitory computer-readable medium of claim 13, wherein the subset of the set of clocked circuit elements comprises at least one flip-flop.

19. The non-transitory computer-readable medium of claim 18, wherein the input/output switching activity information comprises D/Q switching activity for the at least one flip-flop.

20. A method comprising:

accessing, by a hardware processor, circuit design data that describes a netlist of a circuit design, the netlist comprising one or more clocked circuit elements of the circuit design;

accessing, by the hardware processor, clock tree specification data that describes one or more clock tree constraints for the circuit design; and generating, by the hardware processor, a clock tree that provides a clock signal to a set of clocked circuit elements of the one or more clocked circuit elements, the generating of the clock tree comprising cloning an existing clock gate in the clock tree based on at least one clock tree constraint from the clock tree specification data and based on input/output switching activity information for a subset of the set of clocked circuit elements, the existing clock gate forming an existing clock gate cluster that comprises clock pins of the subset of clocked circuit elements.

* * * * *